United States Patent
Nishizawa et al.

(10) Patent No.: US 6,778,609 B2
(45) Date of Patent: Aug. 17, 2004

(54) MPEG IMAGE DECODING APPARATUS AND METHOD FOR SWITCHING OPERATION OF SEARCHING FOR SPECIFIC CODE IN BIT STREAM

(75) Inventors: Masaki Nishizawa, Tokyo (JP); Mitsuhiro Ishii, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 738 days.

(21) Appl. No.: 09/779,730

(22) Filed: Feb. 9, 2001

(65) Prior Publication Data

US 2001/0014126 A1 Aug. 16, 2001

(30) Foreign Application Priority Data

Feb. 14, 2000 (JP) ...................................... P2000-035744

(51) Int. Cl.$^7$ ........................... H04N 7/12; H04N 11/02
(52) U.S. Cl. ............................. 375/240.25; 375/240.26
(58) Field of Search ................. 375/240.25, 240.26, 375/240.23, 240.29, 354, 368; 370/392

(56) References Cited

U.S. PATENT DOCUMENTS 5,708,659 A * 1/1998 Rostoker et al. ............ 370/392
5,943,374 A   8/1999 Kokuryo et al.
6,470,034 B1 * 10/2002 Tan ............................ 370/514

FOREIGN PATENT DOCUMENTS

| JP | 9-233064 | 9/1997 |
|---|---|---|
| JP | 11-168458 | 6/1999 |

* cited by examiner

Primary Examiner—Chris Kelley
Assistant Examiner—Erick Rekstad
(74) Attorney, Agent, or Firm—Foley & Lardner LLP

(57) ABSTRACT

An MPEG image decoding apparatus and method is disclosed, by which normal images can be supplied even if a bit stream is a nonstandardized bit stream having an error. The apparatus comprises a buffer for temporarily storing data of an input bit stream and outputting the stored data in input order; a register for storing the data output from the buffer in its empty area; a first data-search section for searching the data stored in the register so as to detect a specific code by executing a byte-unit collating operation; a second data-search section for searching the data so as to detect a specific code by executing a bit-unit collating operation; a control section for choosing one of outputs from the first and second data-search sections; a shifter for extracting a retrieved data from among the data stored in the register based on the chosen output, and shifting the remaining non-retrieved data towards the head of the register and making an empty area in the register; and a decoder for decoding the retrieved data.

18 Claims, 4 Drawing Sheets

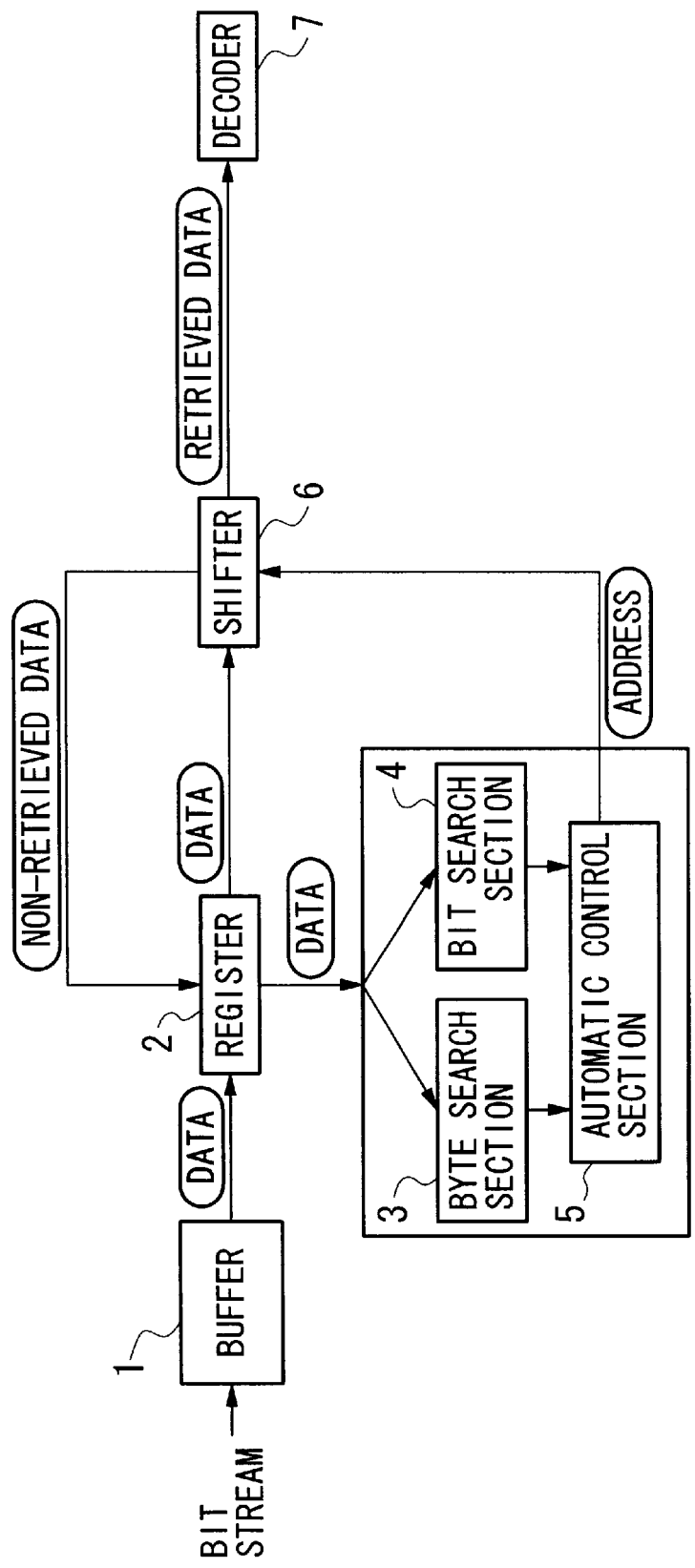

MPEG IMAGE DECODING APPARATUS AND METHOD FOR SWITCHING OPERATION OF SEARCHING FOR SPECIFIC CODE IN BIT STREAM

BACKGROUND OF THE INVENTION

1. Field of the Invention

The present invention relates to an apparatus for decoding a bit stream of image data compressed using the MPEG (Moving Picture Experts Group) format, in particular, to an apparatus which detects a start code at the head of each data included in the bit stream.

2. Description of the Related Art

Each bit stream in the MPEG format has a 6-layer structure; thus, the layer to which each data (included in the bit stream) belongs must be determined, and a specific code called the start code is assigned to each layer of the bit stream.

In each bit stream, any portion other than the start code does not have the same bit pattern as that of the start code. In addition, in the MPEG standard, the start code should start from the first bit of a byte in the bit stream, that is, the first bit of the start code should be positioned at the first bit of a byte. In this case, the start code can be detected by searching each byte of the bit stream.

FIG. 5 shows an example of conventional MPEG image decoding apparatuses. Each bit stream including serial data is input into this MPEG image decoding apparatus, and is stored in a buffer 101. Each bit stream stored in the buffer 101 is read out in the storage order (i.e. FIFO (first-in first-out)), and transferred to a register 102. A byte search section 103 searches the data stored in the register 102 to detect a start code for indicating the starting point of each data. In order to search the data in the register 102 to find the start code, the byte search section 103 collates byte-unit data (i.e., the position for collation in the data is shifted by an integer multiple of a byte) with predetermined data for collation because in the MPEG standard, the start code should start from the first bit of a byte, as explained above.

When the byte search section 103 detects a start code from among the data stored in the register 102, the byte search section communicates the position (i.e., address) of the start code in the data (stored in the register 102) to a shifter 104. The shifter 104 determines the position of the start code in the data transferred from the register 102, by referring to the address communicated by the byte search section 103. The shifter 104 sends "retrieved data" to a decoder 105, where the retrieved data starts from an already-detected start code and ends immediately before the next start code which has also been detected, and thus the retrieved data includes a start code and data related to the start code. The decoder 105 decodes the retrieved data sent from the shifter 104.

On the other hand, the data from the above next start code in the shifter 104 is shifted towards the head to occupy the area which has been occupied by the retrieved data, and the shifted data is returned to the register 102 as "non-retrieved data". In the register 102, the empty area provided after the non-retrieved data is filled with next data from buffer 101. The byte search section 103 then searches for the next start code.

As explained above, in each bit stream, the head of the start code should be positioned at the head of a byte based on the MPEG standard, and in the conventional MPEG image decoding apparatus, each start code in the bit stream is searched for in byte units.

However, the above-explained conventional technique has the following problem: If an unnecessary bit is inserted or if a necessary bit is omitted in a bit stream for any reason, the head of the start code is shifted from the first bit of a relevant byte. In this case, the start code cannot be detected in the above conventional technique, and normal images cannot be shown on a display.

SUMMARY OF THE INVENTION

In consideration of the above circumstances, an objective of the present invention is to provide an MPEG image decoding apparatus and method for supplying normal images even if an unnecessary bit is inserted or a necessary bit is omitted in a bit stream (i.e., a nonstandardized bit stream) and thus the bit stream has an error.

Therefore, the present invention provides an MPEG image decoding apparatus comprising:

a buffer for receiving a bit stream which has been compressed based on the MPEG format, and temporarily storing data of the bit stream and outputting the stored data in input order;

a register for receiving the data output from the buffer and storing the data in an empty area of the register in turn;

a first data-search section for:
  searching the data stored in the register so as to detect the position of a specific code by executing a byte-unit data collating operation in which the collated position in the data is shifted by an integer multiple of a byte; and
  outputting a search result;

a second data-search section for:
  searching the data stored in the register so as to detect the position of a specific code by executing a bit-unit data collating operation in which the collated position in the data is shifted by an integer multiple of a bit; and
  outputting a search result;

a search operation control section for choosing one of an output from the first data-search section and an output from the second data-search section;

a shifter for extracting a retrieved data from among the data stored in the register based on the output chosen by the search operation control section, and shifting the remaining non-retrieved data towards the head of the register and making an empty area after the non-retrieved data in the register; and a decoding section for decoding the retrieved data extracted by the shifter.

Typically, the specific code which is searched for by the first and second data-search sections is a start code positioned at the head of each specific data included in the bit stream.

Typically, the search operation control section first chooses the output from the first data-search section, and if the first data-search section did not detect the specific code, then the search operation control section chooses the output from the second data-search section.

More specifically, the search operation control section may choose the output from the second data-search section:
(i) if the first data-search section searched all the data in the register and did not detect the specific code;
(ii) if the first data-search section did not detect the specific code during a predetermined time;
(iii) if the first data-search section processed a predetermined amount of data in the data collating operation and did not detect the specific code;
(iv) if the total amount of shifts of the collated data position in the data collating operation of the first data-search section exceeds a predetermined limit value; or (v) if the search operation control section detects the amount of bit errors in the bit stream, and the amount of bit errors exceeds a predetermined limit value.

The buffer, the register, the first data-search section, the second data-search section, the search operation control section, the shifter, and the decoding section may be formed on a semiconductor integrated circuit substrate.

The present invention also provides an MPEG image decoding method comprising:

a temporary storage step of receiving a bit stream which has been compressed based on the MPEG format, and temporarily storing data of the bit stream and outputting the stored data in input order;

a register storage step of receiving the data output in the temporary storage step and storing the data in an empty area of a register in turn;

a first data-search step of:

searching the data stored in the register so as to detect the position of a specific code by executing a byte-unit data collating operation in which the collated position in the data is shifted by an integer multiple of a byte; and outputting a search result;

a second data-search step of:

searching the data stored in the register so as to detect the position of a specific code by executing a bit-unit data collating operation in which the collated position in the data is shifted by an integer multiple of a bit; and outputting a search result;

an output choosing step of choosing one of an output in the first data-search step and an output in the second data-search step;

a shift step of extracting a retrieved data from among the data stored in the register based on the output chosen in the output choosing step, and shifting the remaining non-retrieved data towards the head of the register and making an empty area after the non-retrieved data in the register; and a decoding step of decoding the retrieved data extracted in the shift step.

Typically, the specific code searched for in the first and second data-search steps is a start code positioned at the head of each specific data included in the bit stream.

According to the present invention, in the search for a specific code (typically, the start code) in the bit stream compressed based in the MPEG format, a dynamic switching of the search method is possible, and the specific code can be reliably detected. That is, even if unnecessary data is inserted or necessary data is omitted in the bit stream, the start code can be detected. Therefore, each start code in the start code can be reliably detected and images can be smoothly reproduced.

BRIEF DESCRIPTION OF THE DRAWINGS

FIG. 1 is a block diagram showing the structure of the MPEG image decoding apparatus as an embodiment according to the present invention.

DESCRIPTION OF THE PREFERRED EMBODIMENTS

Figures 2A, 2B:
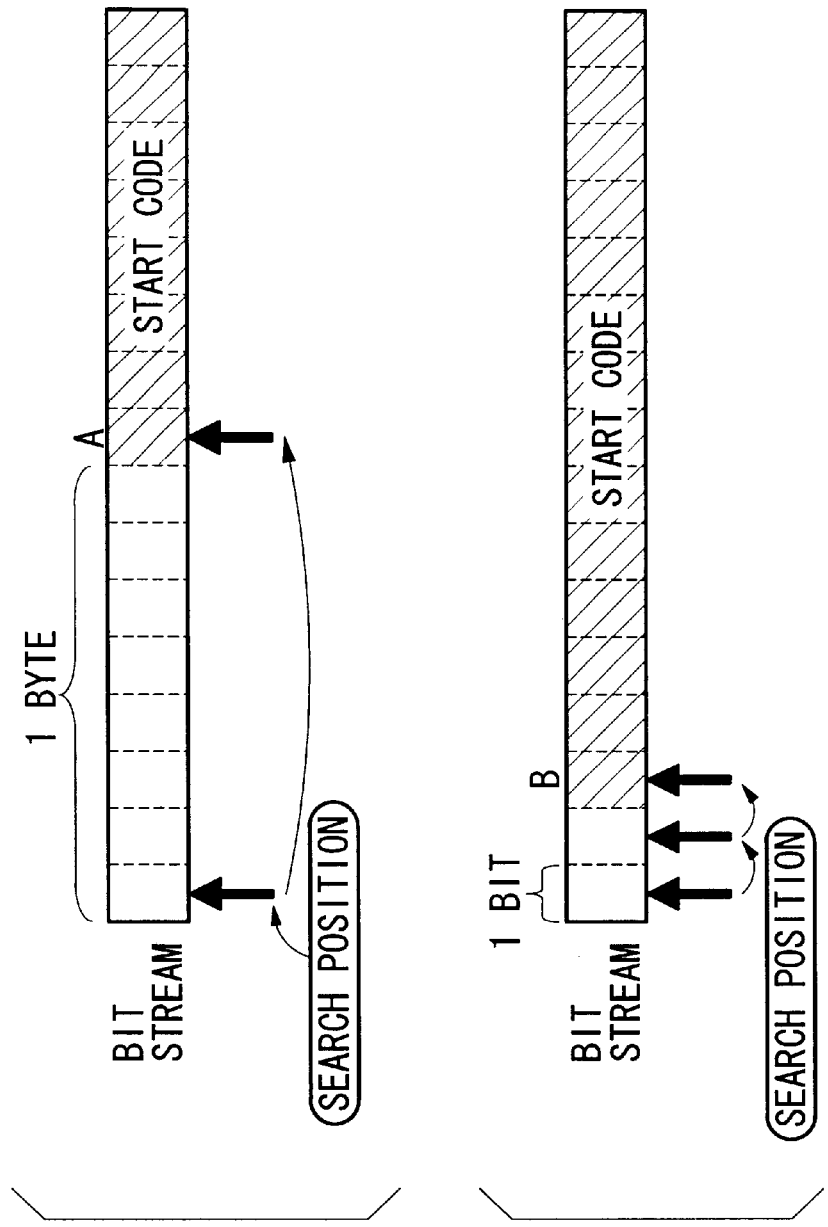
FIG. 2A is a diagram for explaining the operation of searching a start code in the bit stream by using the byte search section 3.
FIG. 2B is a diagram for explaining the operation of searching a start code in the bit stream by using the bit search section 4.

Hereinafter, an embodiment according to the present invention will be explained in detail with reference to the drawings.

FIG. 1 is a block diagram showing the structure of the MPEG image decoding apparatus as an embodiment of the present invention. Reference numeral 1 indicates a buffer for temporarily storing each bit stream input into the MPEG image decoding apparatus. This buffer 1 stores the bit streams in the input order and outputs each bit stream in the storage order (i.e., FIFO (first-in first-out)).

Reference numeral 2 indicates a register for receiving each bit stream (i.e., data) output from the buffer 1, and stores the data in itself. Reference numeral 3 indicates a byte search section for searching the data stored in the register 2 (in byte units) to detect a start code. Reference numeral 4 indicates a bit search section for searching the data stored in the register 2 (in bit units) to detect a start code. When the byte search section 3 or the bit search section 4 detects a start code from among the data stored in the register 2, the section 3 or 4 outputs the position of the start code, that is, the address in the data stored in the register 2.

Reference numeral 5 indicates an automatic control section for choosing one of the outputs from the byte search section 3 and the bit search section 4, and outputting the chosen or selected output.

Reference numeral 6 indicates a shifter for receiving data transmitted from the register 2, and shifts the data based on the address output from the automatic control section 5. That is, the shifter 6 (i) determines the position of the start code in the data input from the register 2, according to the address output from the automatic control section 5, (ii) sends "retrieved data" to a decoder 7 (explained below) where the retrieved data is a data portion which starts from a start code and ends immediately before the next start code, (iii) the remaining data portion from the next start code is shifted towards the head, and (iv) returns this data called "non-retrieved data" to the register 2, where the non-retrieved data has an empty area at the end of it. The register 2 fills the empty area of the non-retrieved data with data from buffer 1.

Reference numeral 7 indicates a decoder for decoding the retrieved data transmitted from the shifter 6, so as to retrieve image data.

The operation of the present embodiment will be explained below. The bit stream input into the MPEG image decoding apparatus is temporarily stored in buffer 1. The buffer 1 stores each data of the bit stream input into the MPEG image decoding apparatus in the input order, and outputs data in the storage order (i.e., FIFO).

The data output from the buffer 1 is stored in register 2. The byte search section 3 searches the data stored in the register 2 to detect a start code in byte units. On the other hand, the bit search section 4 searches the data stored in the register 2 to detect a start code in bit units. The methods of searching for the start code by using the byte search section 3 and the bit search section 4 will be explained below in detail.

When the byte search section 3 or the bit search section 4 detects a start code in the data stored in the register 2, the search section outputs the position of the start code, that is, the address.

The automatic control section 5 receives both the output from the byte search section 3 and the output from the bit search section 4, and chooses and outputs one of them. Usually, the automatic control section 5 chooses the output from the byte search section 3. If the byte search section 3 cannot detect a start code in the data stored in the register 2, the automatic control section 5 switches the search section of the start code to the bit search section 4, and chooses the output from the bit search section 4.

When the bit search section 4 has detected a start code, the automatic control section 5 again switches the search section and chooses the output from the byte search section 3. This is because the time necessary for searching for a start code by using the byte search section 3 is shorter than that necessary for searching for a start code by using the bit search section 4. That is, it is preferable to use the bit search section 4 only when the byte search section 3 cannot detect a start code.

It is also possible to return to the search using the byte search section 3 after the bit search section 4 detects start codes at the normal position (i.e., from the first bit of a byte) for a predetermined number of times, that is, after the interval between the start codes has returned to an integer multiple of a byte (i.e., the correct interval), and this condition has been confirmed for the predetermined number of times.

When a start code is detected from among the data stored in the register 2 by the byte search section 3 or the bit search section 4, the register 2 transmits all the stored data to the shifter 6. After this transmission, the register stops receiving data from the buffer 1 until the register receives the non-retrieved data and fills its empty area with data output from the buffer. The shifter 6 determines the position of the start code in the data transmitted from the register 6 according to the address communicated by the automatic control section 5, and sends retrieved data (i.e., from a start code to the portion before the next start code) to decoder 7. The decoder 7 decodes the retrieved data transmitted from the shifter 6, so as to retrieve image data.

Here, the shifter 6 includes a remaining data portion from the next start code, that is, data which was stored in the buffer 1 from the next start code. The shifter shifts the remaining data towards the head of the shifter, and returns "non-retrieved data" to the register 2, where the non-retrieved data consists of the shifted data and the following data indicating an empty area. In the register 2, the empty area of the non-retrieved data is filled with next data from the buffer 1. When the filling of data in the register 2 is completed, the byte search section 3 and the bit search section 4 start searching of the next start code.

Next, with reference to FIGS. 2A and 2B, the operation of searching for the start code from among the data in each bit stream by using the byte search section 3 and the bit search section 4 will be explained in detail.

FIG. 2A shows a bit stream including no error, to which the byte-unit search using the byte search section 3 is applied. That is, if a bit stream includes no error, the start bit A of the start code is always positioned at the first bit of a byte. Therefore, each interval between a start code and the next start code should be an integer multiple of a byte (i.e., an integer multiple of 8 bits). Therefore, if the position of the previous start code has been detected, the byte search section 3 can detect all the following start codes by searching data for each byte.

FIG. 2B shows a bit stream including an error. In this bit stream, the start bit B of the start code is not positioned at the first bit of a bite because of an error.

Such an error may occur (i) when coded data passes through a transmission path connected to the MPEG image decoding apparatus, (ii) when data are processed before the data is input into the MPEG image decoding apparatus, or (iii) when a bit stream is transmitted from a circuit block to the next circuit block in the MPEG image decoding apparatus. According to the error, unnecessary data may be inserted or necessary data may be lost or omitted. Each bit stream includes various kinds of data such as image data, and header data ahead of the image data. In order to retrieve all the data of the bit stream, it is necessary to respectively and correctly recognize such image data and header data. If an error explained above occurs, the above recognition cannot correctly be performed.

Owing to such an error, the interval between a start code to the next start code may not be an integer multiple of a byte (i.e., 8 bits). In this case, the byte search section 3 cannot detect the start code; thus, the section for searching for the start code is switched to the bit search section 4 by which the search position is shifted for each bit. Accordingly, even in a bit stream having start codes whose interval is not an integer multiple of a bite (i.e., a bit stream including an error), all the start codes can be detected.

The search using the bit search section 4 is reliable but needs a relatively long time. Therefore, usually, the search using the byte search section 3 is employed. The search using the bit search section 4 is employed only when the interval between the start codes is not an integer multiple of a byte because an unnecessary bit is inserted or a necessary bit is omitted for any reason. When the bit search section 4 detects a start code, the section for searching for the start code is immediately switched to the byte search section 3.

The switching between the search using the byte search section 3 and the search using the bit search section 4 is executed by the automatic control section 5. That is, the automatic control section 5 switches the start-code search section to the bit search section 4 when the byte search section 3 cannot detect a start code from among the data stored in the register 2.

The above switching may be performed if the byte search section 3 cannot detect a start code during a predetermined time. In this case, even if the byte search section 3 cannot detect a start code from among the data stored in the register 2, the search using the byte search section 3 is continued during the predetermined time. That is, if the predetermined time has not yet elapsed, the data in the register 2 is transmitted via shifter 6 to decoder 7, and the next data is input from the buffer 1 to the register 2, thereby continuing the byte-unit search using the byte search section 3. A reasons for providing this process is that the shifter has a limited area, and the length of each image data is not fixed and may be longer than that limit. In this case, the data input into the shifter may fill up the limited area, and the data may be transferred to the decoder as a retrieved data.

If the byte search section 3 did not detect a start code during the predetermined time, the start-code search section is switched to the bit search section 3 for searching a start code in bit units.

The above switching may be performed not based on time, but based on the amount of data (i.e., the number of bits or bytes), measured or counted from the time when the previous start code was detected.

Generally, each start code does not always appear at regular intervals because the amount of data following each start code is not fixed, as explained above. For example, if the data after a start code is a simple image data, the length of data is short and thus the interval between the start codes is short. On the contrary, if the amount of dada after a start code is large, then the data length is long and the interval between the start codes is long. Therefore, the interval between the start codes is not fixed; however, the variation should be in a predetermined range. More specifically, the interval between the start codes should be in a range from a specific minimum value to a specific maximum value. Therefore, if the above elapsed time or the measured amount of data exceeds a specific maximum value, the bit stream may be regarded as having an error, thereby switching the search method to the bit-unit search.

It is also possible to detect the amount of bit errors in the bit stream, more specifically, the number of occasions in which a specific bit in each bit stream does not have a specific value during a predetermined time. Preferably, if the amount of bit errors exceeds a predetermined level, the start-code search method is switched from the byte-unit search using the byte search section 3 to the bit-unit search using the bit search section 4. In this case, if the level of the amount of bit errors in the bit stream becomes lower than the predetermined level, the byte search section 3 is employed again.

Below, with reference to FIGS. 3A and 3B, the operation of searching for the start code by using the byte search section 3 will be explained in more detail.

Before the explanation, the structure of the start code will be explained. The start code is a 4-byte data. The structure of the former 3 bytes (i.e., 24 bits) of the 4-byte data is fixed as "00 (h)", "00 (h)", and "01 (h)". In each bit stream, no other portion has this data pattern of "00 00 01 (h)". The 4th byte of the start code indicates a specific kind of the start code. For example, if this 4th byte is "00 (h)", this indicates a "picture_start_code", while if this 4th byte is "B3 (h)", this indicates a "sequence_header_code". The data such as the size of an image follows the 4-byte start code.

Therefore, the byte search section 3 can detect the position of each start code by detecting a portion consisting of successive three bytes having the value of "00 00 01 (h)". Accordingly, the byte search section 3 stores this data "00 00 01 (h)" as a 3-byte (i.e., 24-bit) expectation (or expected value) so as to collate this data with data stored in the register 2.

Figure 3A:
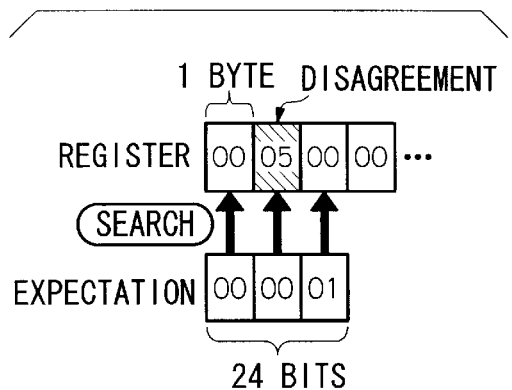
FIGS. 3A and 3B are diagrams for showing the processes of the byte-unit start-code search using the byte search section 3.
Figure 3B:
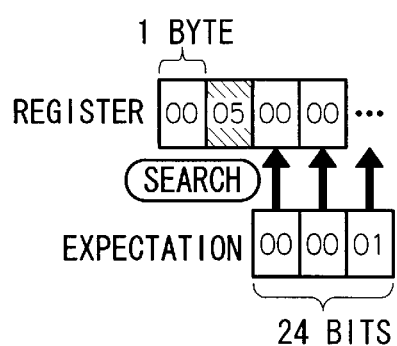

First, the byte search section 3 collates the 3 bytes at the head of the data stored in the register 2 with the 3-byte expectation, as shown in FIG. 3A. In this collation, if the collated second bytes do not agree with each other, the first bit of the expectation is shifted to the first bit of the byte next to the above second byte which did not agree with the relevant byte of the expectation, as shown in FIG. 3B, and the collation is performed again. That is, in the byte search section 3, the shift length is an integer multiple of a byte.

The byte search section 3 repeatedly executes the above collating operation until the expectation and any 3-byte data agree with each other. The position where the expectation and any 3-byte data agree with each other is the head of the relevant start code.

Below, with reference to FIGS. 4A and 4B, the operation of searching a start code by using the bit search section 4 will be explained in more detail.

Similar to the operation of the byte search section 3, the bit search section 4 can detect a start code by detecting a 3-byte data portion having the value "00 00 01 (h)", from among the data stored in the register 2. Therefore, the bit search section 4 also stores the 3-byte (i.e., 24-bit) data of "00 00 01 (h)" as an expectation. In other words, the bit search section 3 stores a 24-bit expectation consisting of 23 bits of "0" and a bit of "1".

Figure 4A:
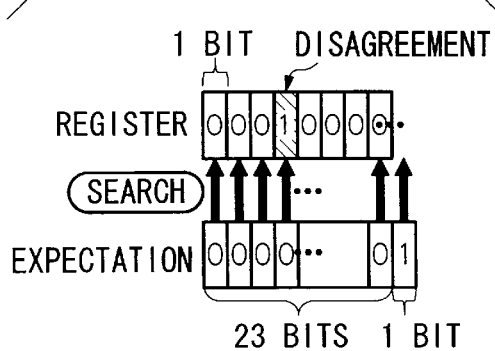
FIGS. 4A and 4B are diagrams for showing the processes of the bit-unit start-code search using the bit search section 4.
Figure 4B:
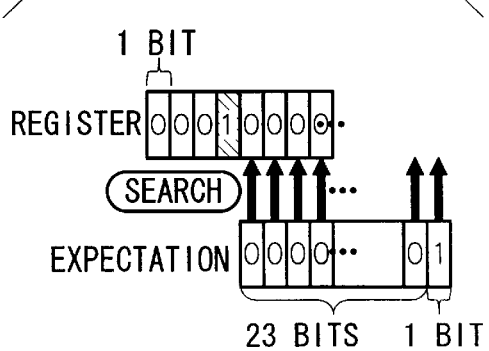
Figure 5:
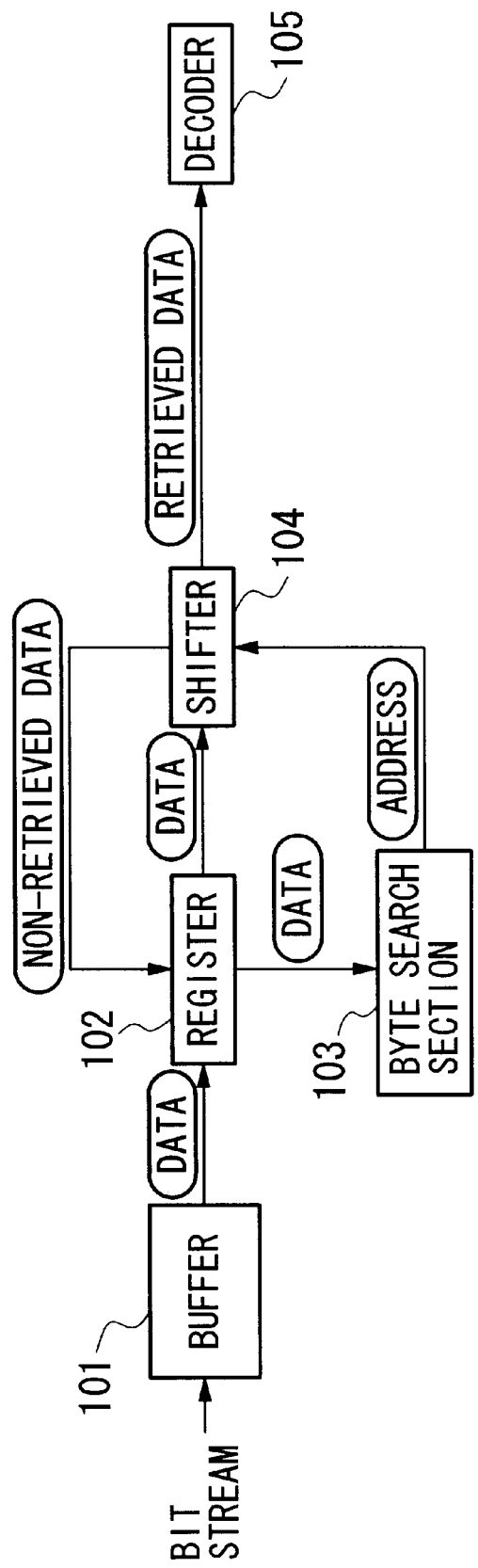
FIG. 5 is a block diagram showing the structure of a conventional MPEG image decoding apparatus.

First, the bit search section 4 collates the 24-bit expectation with the 24 bits at the head of the data stored in the register 2, as shown in FIG. 4A. In this collation, if the 4th bits of both the collated data do not agree with each other, then the bit search section 4 shifts the first bit of the expectation to the fifth bit of the data in the register 2, that is, the bit next to the bit which did not agree with the relevant bit of the expectation, and performs the collating operation again. That is, in the bit search section 4, the shift length is an integer multiple of a bit.

The bit search section 4 repeatedly performs the above operation until the expectation agree with a portion of the data. The position where the expectation agrees with any data portion corresponds to the head portion of the start code. As explained above, in the start-code search using the bit search section 4, the shift length for collation is an integer multiple of a bit. Therefore, even if the bit stream includes an error and the interval of the start codes is not an integer multiple of a byte, each start code can be detected.

In the above embodiment, the switching between the byte-unit search and the bit-unit search is performed by the automatic control section 5; however, this switching may be performed using a software means.

In addition, if the total amount of shifts of the collated data position in the data collating operation of the byte search section 3 exceeds a predetermined limit value, then the start-code search section may be switched from the byte search section 3 to the bit search section 4.

The buffer, the register, the byte search section, the bit search section, the automatic control section, the shifter, and the decoder may be formed on a semiconductor integrated circuit substrate.

Additionally, in the above embodiment, the switching of the method of searching for a start code has been explained; however, the present invention can be applied to detection of a pattern other than the start code.

What is claimed is:

1. An MPEG image decoding apparatus comprising:
   a buffer for receiving a bit stream which has been compressed based on the MPEG format, and temporarily storing data of the bit stream and outputting the stored data in input order;
   a register for receiving the data output from the buffer and storing the data in an empty area of the register in turn;
   a first data-search section for:
      searching the data stored in the register so as to detect the position of a specific code by executing a byte-unit data collating operation in which the collated position in the data is shifted by an integer multiple of a byte; and
      outputting a search result;
   a second data-search section for:
      searching the data stored in the register so as to detect the position of a specific code by executing a bit-unit data collating operation in which the collated position in the data is shifted by an integer multiple of a bit; and
      outputting a search result;
   a search operation control section for choosing one of an output from the first data-search section and an output from the second data-search section;
   a shifter for extracting a retrieved data from among the data stored in the register based on the output chosen by the search operation control section, and shifting the remaining non-retrieved data towards the head of the register and making an empty area after the non-retrieved data in the register; and
   a decoding section for decoding the retrieved data extracted by the shifter.

2. An MPEG image decoding apparatus as claimed in claim 1, wherein the specific code which is searched for by the first and second data-search sections is a start code positioned at the head of each specific data included in the bit stream.

3. An MPEG image decoding apparatus as claimed in claim 1 wherein the search operation control section first chooses the output from the first data-search section, and if the first data-search section did not detect the specific code, then the search operation control section chooses the output from the second data-search section.

4. An MPEG image decoding apparatus as claimed in claim 1 wherein the search operation control section first chooses the output from the first data-search section, and if the first data-search section searched all the data in the register and did not detect the specific code, then the search operation control section chooses the output from the second data-search section.

5. An MPEG image decoding apparatus as claimed in claim 1 wherein the search operation control section first chooses the output from the first data-search section, and if the first data-search section did not detect the specific code during a predetermined time, then the search operation control section chooses the output from the second data-search section.

6. An MPEG image decoding apparatus as claimed in claim 1 wherein the search operation control section first chooses the output from the first data-search section, and if the first data-search section processed a predetermined amount of data in the data collating operation and did not detect the specific code, then the search operation control section chooses the output from the second data-search section.

7. An MPEG image decoding apparatus as claimed in claim 1 wherein the search operation control section first chooses the output from the first data-search section, and if the total amount of shifts of the collated data position in the data collating operation of the first data-search section exceeds a predetermined limit value, then the search operation control section chooses the output from the second data-search section.

8. An MPEG image decoding apparatus as claimed in claim 1 wherein the search operation control section first chooses the output from the first data-search section and detects the amount of bit errors in the bit stream, and if the amount of bit errors exceeds a predetermined limit value, then the search operation control section chooses the output from the second data-search section.

9. An MPEG image decoding apparatus as claimed in claim 1, wherein the buffer, the register, the first data-search section, the second data-search section, the search operation control section, the shifter, and the decoding section are formed on a semiconductor integrated circuit substrate.

10. An MPEG image decoding method comprising:
a temporary storage step of receiving a bit stream which has been compressed based on the MPEG format, and temporarily storing data of the bit stream and outputting the stored data in input order;
a register storage step of receiving the data output in the temporary storage step and storing the data in an empty area of a register in turn;
a first data-search step of:
  searching the data stored in the register so as to detect the position of a specific code by executing a byte-unit data collating operation in which the collated position in the data is shifted by an integer multiple of a byte; and
  outputting a search result;
a second data-search step of:
  searching the data stored in the register so as to detect the position of a specific code by executing a bit-unit data collating operation in which the collated position in the data is shifted by an integer multiple of a bit; and
  outputting a search result;
an output choosing step of choosing one of an output in the first data-search step and an output in the second data-search step;
a shift step of extracting a retrieved data from among the data stored in the register based on the output chosen in the output choosing step, and shifting the remaining non-retrieved data towards the head of the register and making an empty area after the non-retrieved data in the register; and
a decoding step of decoding the retrieved data extracted in the shift step.

11. An MPEG image decoding method as claimed in claim 10, wherein the specific code which is searched for in the first and second data-search steps is a start code positioned at the head of each specific data included in the bit stream.

12. An MPEG image decoding apparatus as claimed in claim 2, wherein the search operation control section first chooses the output from the first data-search section, and if the first data-search section did not detect the specific code, then the search operation control section chooses the output from the second data-search section.

13. An MPEG image decoding apparatus as claimed in claim 2, wherein the search operation control section first chooses the output from the first data-search section, and if the first data-search section searched all the data in the register and did not detect the specific code, then the search operation control section chooses the output from the second data-search section.

14. An MPEG image decoding apparatus as claimed in claim 2, wherein the search operation control section first chooses the output from the first data-search section, and if the first data-search section did not detect the specific code during a predetermined time, then the search operation control section chooses the output from the second data-search section.

15. An MPEG image decoding apparatus as claimed in claim 2, wherein the search operation control section first chooses the output from the first data-search section, and if the first data-search section processed a predetermined amount of data in the data collating operation and did not detect the specific code, then the search operation control section chooses the output from the second data-search section.

16. An MPEG image decoding apparatus as claimed in claim 2, wherein the search operation control section first chooses the output from the first data-search section, and if the total amount of shifts of the collated data position in the data collating operation of the first data-search section exceeds a predetermined limit value, then the search operation control section chooses the output from the second data-search section.

17. An MPEG image decoding apparatus as claimed in claim 2, wherein the search operation control section first chooses the output from the first data-search section and detects the amount of bit errors in the bit stream, and if the amount of bit errors exceeds a predetermined limit value, then the search operation control section chooses the output from the second data-search section.

18. An MPEG image decoding apparatus as claimed in claim 2, wherein the buffer, the register, the first data-search section, the second data-search section, the search operation control section, the shifter, and the decoding section are formed on a semiconductor integrated circuit substrate.

* * * * *